US010807148B2

(12) United States Patent
Damphousse et al.

(10) Patent No.: US 10,807,148 B2
(45) Date of Patent: Oct. 20, 2020

(54) UPSET PROTRUSION JOINING AND FORGING GUN THEREFOR

(71) Applicants: Kurt P Damphousse, Maidstone (CA); Stephen D Logan, Northville, MI (US); John Macdonald, White Lake, MI (US); Kenneth Martz, Highland Township, MI (US)

(72) Inventors: Kurt P Damphousse, Maidstone (CA); Stephen D Logan, Northville, MI (US); John Macdonald, White Lake, MI (US); Kenneth Martz, Highland Township, MI (US)

(73) Assignee: FCA US LLC, Auburn Hills, MI (US)

( * ) Notice: Subject to any disclaimer, the term of this patent is extended or adjusted under 35 U.S.C. 154(b) by 234 days.

(21) Appl. No.: 16/001,019

(22) Filed: Jun. 6, 2018

(65) Prior Publication Data
US 2018/0361463 A1    Dec. 20, 2018

Related U.S. Application Data

(60) Provisional application No. 62/522,187, filed on Jun. 20, 2017.

(51) Int. Cl.
| B21J 15/36 | (2006.01) |
| B21J 5/08 | (2006.01) |
| B21J 15/28 | (2006.01) |
| B21J 15/08 | (2006.01) |
| B21J 15/48 | (2006.01) |
| B21K 25/00 | (2006.01) |
| F16B 5/04 | (2006.01) |
| F16B 5/08 | (2006.01) |

(52) U.S. Cl.
CPC ............. *B21J 15/36* (2013.01); *B21J 5/08* (2013.01); *B21J 15/08* (2013.01); *B21J 15/285* (2013.01); *B21J 15/48* (2013.01); *B21K 25/00* (2013.01); *F16B 5/045* (2013.01); *F16B 5/08* (2013.01)

(58) Field of Classification Search
CPC . B21J 15/02; B21J 15/027; B21J 15/08; B21J 15/28; B21J 15/285; B21J 15/36; B21D 39/03; B21D 39/031; B21D 15/10; B21D 15/26
See application file for complete search history.

(56) References Cited

U.S. PATENT DOCUMENTS

| 2,958,230 A | 11/1960 | Haroldson |
| 3,451,456 A | 6/1969 | Dey |
| 5,461,768 A * | 10/1995 | Matsumoto ............ B21D 39/00 219/150 R |
| 6,206,640 B1 | 3/2001 | Andulics et al. |
| 6,359,249 B1 * | 3/2002 | Brown ................. B21D 39/021 219/86.31 |
| 7,757,381 B2 * | 7/2010 | Kadohira ................. B21J 9/025 29/715 |
| 2004/0164124 A1 * | 8/2004 | Lundstrom .............. B21J 15/02 228/135 |
| 2008/0127703 A1 | 6/2008 | Kadohira et al. |
| 2012/0210558 A1 | 8/2012 | Logan et al. |

(Continued)

*Primary Examiner* — Edward T Tolan
(74) *Attorney, Agent, or Firm* — Ralph E. Smith

(57) ABSTRACT

An upset protrusion joining gun for joining two parts together by forging a protrusion of one part that extends through an opening in the other part to form a boss that extends over a portion of the other part surrounding the opening.

9 Claims, 3 Drawing Sheets

(56) References Cited

U.S. PATENT DOCUMENTS

| | | | | |
|---|---|---|---|---|
| 2016/0067815 A1* | 3/2016 | Nicewonger | ...... | H05K 7/20272 |
| | | | | 219/120 |
| 2016/0354872 A1* | 12/2016 | Koscielski | ............ | B23P 19/001 |
| 2017/0008068 A1* | 1/2017 | Schmidt | .................... | B21J 15/10 |
| 2017/0044637 A1* | 2/2017 | Campbell | ................ | C21D 9/46 |
| 2017/0216957 A1* | 8/2017 | Hartwig-Biglau | ..... | B23K 11/30 |
| 2018/0001461 A1* | 1/2018 | Pedicini | .................. | B25C 1/047 |
| 2018/0272419 A1* | 9/2018 | Draht | ..................... | B21J 15/20 |

* cited by examiner

UPSET PROTRUSION JOINING AND FORGING GUN THEREFOR

CROSS-REFERENCE TO RELATED APPLICATIONS

This application claims the benefit of U.S. Provisional Application No. 62/522,187 filed on Jun. 20, 2017. The entire disclosure of the above application is incorporated herein by reference.

FIELD

The present invention relates to upset protrusion joining of parts.

BACKGROUND

Due to the dissimilar material characteristics of magnesium, aluminum and steel, magnesium parts cannot be welded to aluminum or steel parts and aluminum parts cannot be welded to steel parts. Fasteners are often used to join magnesium parts together with either steel or aluminum parts and to join aluminum parts with steel parts. A joining technique known as upset protrusion forming has also been used to join magnesium parts together with either steel or aluminum parts and aluminum parts together with steel parts, such as described in US Pub. 2012/0210558 for "Upset Protrusion Joining," the entire disclosure of which is incorporated herein by reference. Upset protrusion joining may be referred to herein as UPJ. With reference to FIG. 1 of US Pub. 2012/0210558 reproduced herein as FIG. 3 (with changes to some of the reference numbers), in UPJ, a first one of parts 10, 12 is formed with a protrusion 16 extending from a base 14 and the second one the parts has a corresponding opening 18 through which the protrusion 16 is received. Parts 10 and 10 are illustratively dissimilar parts meaning that two parts are made of different materials, such as magnesium on the one hand and steel or aluminum on the other hand, or aluminum on the one hand and steel on the other hand. Illustratively, opening 18 has a similar shape as protrusion 16 and is sized to receive protrusion 16. It should be understood, however, that parts made of the same material can be joined together using upset protrusion joining. Force, heat, or both are applied (such as by a tool or tool and heating element) to the protrusion to deform the protrusion of the first part over a portion of the second part surrounding the opening forming a boss such that the second part is retained between the formed boss and the base of the first part.

SUMMARY

In accordance with an aspect of the present disclosure, an upset protrusion forging gun joins two parts together by forging a protrusion of one part that extends through an opening in the other part to form a boss that extends over a portion of the other part surrounding the opening. The upset protrusion joining forging gun has a frame having an arm extending from an end of the frame that cooperates with the end of the frame to provide a C-shaped electrode holder assembly with opposed ends with one of the opposed ends at the end of the frame from which the arm projects. Each of the opposed ends has an electrode assembly affixed thereto. At least one of the electrode assemblies is a movable electrode assembly that is movable with respect to the other electrode assembly. Each electrode assembly has an electrode projecting therefrom that projects toward the electrode that projects from the other electrode assembly. Each electrode has an inner end that faces the inner end of the other electrode. The inner end of each electrode has a forging cap affixed thereto wherein the forging caps are molybdenum forging caps or tungsten-copper forging caps. In an aspect, the tungsten-copper forging cap is 75% tungsten and 25% copper by mass. A servo-actuator is affixed to the frame and mechanically coupled to the movable electrode assembly. A weld power supply is affixed to the frame and electrically coupled to the electrodes. A controller is controller configured to control the actuator to move the movable electrode assembly toward the protrusion of the part having the protrusion at a first rate until the inner end of the electrode of that electrode assembly is at a predetermined distance from the protrusion and then control the actuator to move the movable electrode assembly toward the protrusion at a slower rate until the forging cap on the inner end of the electrode of the movable electrode assembly contacts the protrusion. When the electrode of the movable electrode assembly contacts the protrusion, the controller configured to control the actuator so that the electrode of the movable electrode assembly is urged against the protrusion at a plasticizer force level and to control the weld power supply to supply electric current at a plasticizer current level to the electrodes and maintain the plasticizer force level and plasticizer current level until the controller determines a plasticizer wait time has expired. Upon determining that the plasticizer wait time has expired, the controller configured to control the actuator so that the electrode of the movable electrode assembly is urged against the protrusion at a forging force level and control the weld power supply to supply electric current at a forging current level to the electrodes and maintain the forging force level and forging current level until the controller determines a forging wait time has expired. Upon determining that the forging wait time has expired, the controller configured to control the weld power supply to turn current off and to control the actuator to retract the movable electrode assembly In an aspect, the actuator is mechanically coupled to the movable electrode assembly through a gas spring. In an aspect, the gas spring is a nitrogen spring.

In an aspect, the upset protrusion forging includes a cooling system that circulates cooling fluid to the electrode assemblies and an infrared temperature sensor disposed to sense a temperature of at least the forging cap on the inner end of the electrode of the movable electrode assembly. The controller configured to control the flow of cooling fluid to the electrode assemblies in response to the temperature sensed by the infrared temperature sensor when current is being supplied to the electrodes to control the temperature of at least the forging cap on the inner end of the electrode of the movable electrode assembly.

In an aspect, the upset protrusion forging gun is configured to apply a force against the protrusion by the electrode of the movable electrode assembly of up to 16,000 Newtons and the weld power supply configured to supply current of up to 14,000 amps for up to 30,000 msec. In an aspect, forging caps having diameters ranging from 15 to 19 mm are affixable to the inner ends of the electrodes.

In an aspect, one of the parts is a magnesium part having the protrusion and the other part is an aluminum part. In an aspect, one of the parts is a magnesium part having the protrusion and the other part is a steel part. In an aspect, one of the parts is an aluminum part having the protrusion and the other part is a steel part.

BRIEF DESCRIPTION OF THE DRAWINGS

The present invention will become more fully understood from the detailed description and the accompanying drawings, wherein.

DETAILED DESCRIPTION

Figure 1:
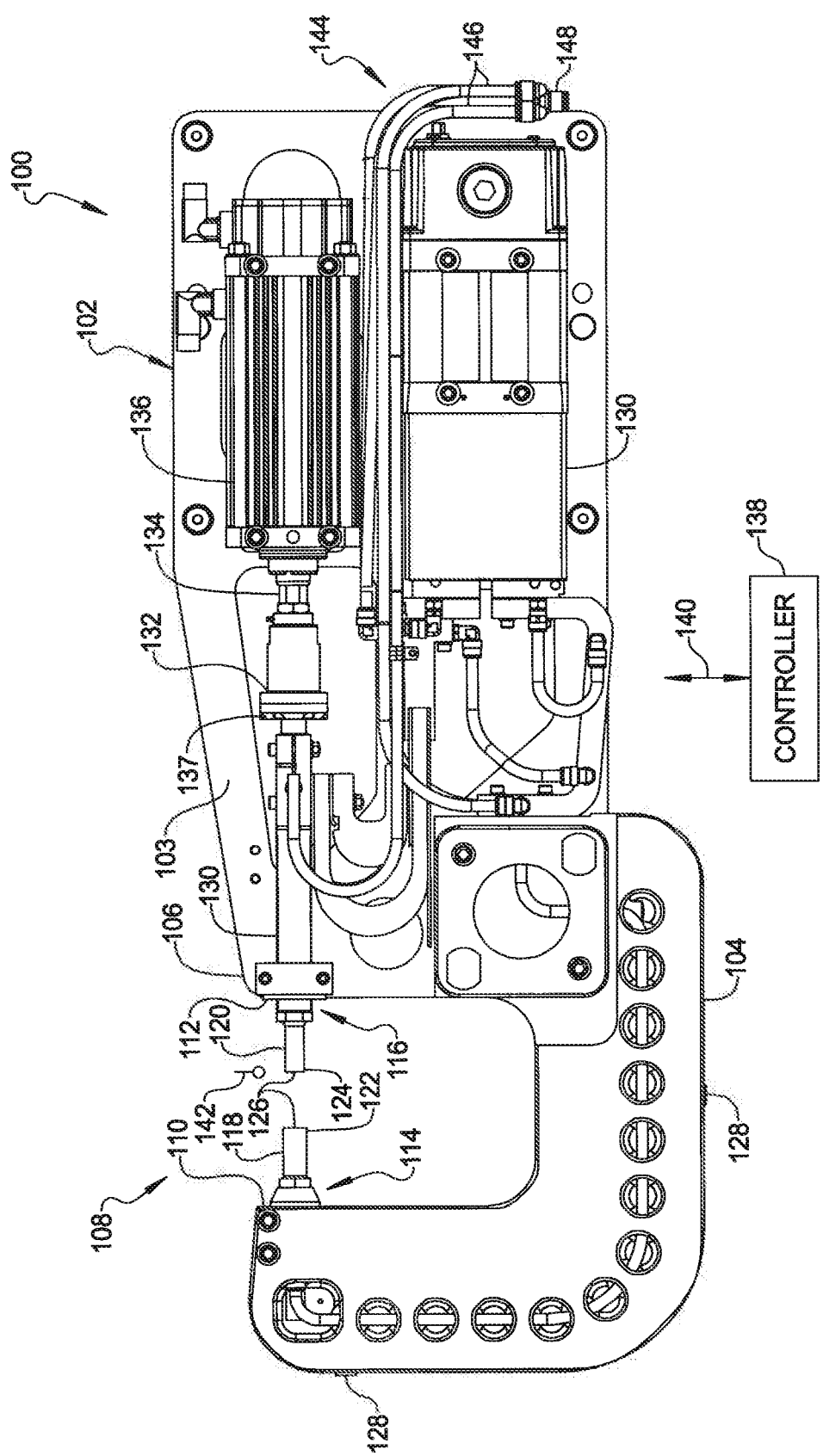
FIG. 1 is a perspective view of an upset protrusion joining forging gun in accordance with an aspect of the present disclosure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

FIG. 1 shows an UPJ forging gun 100 in accordance with an aspect of the present disclosure. UPJ forging gun 100 includes a frame 102 having opposed side plates 103 (only one of which is shown in FIG. 1) having an arm 104 extending from an end 106 of frame 102 that cooperate to provide a C shaped electrode holder assembly 108 with opposed ends 110, 112. First and second electrode assemblies 114, 116 are affixed to opposed ends 110, 112 of electrode holder 108, with electrode assembly 114 affixed to opposed end 110 and the other of electrode assembly 116 affixed to opposed end 112. Electrode assembly 114 includes an electrode 118 projecting therefrom and electrode assembly 116 includes an electrode 120 projecting therefrom with the electrodes 118, 120 projecting toward each other. At least electrode assembly 116 is a movable electrode assembly and is movable toward and away from electrode 118. Electrode assembly 116 is hereinafter referred to as movable electrode assembly 116. It should be understood that in a variation, both electrode assemblies 114, 116 are movable toward and away from each other. In an idle position, movable electrode assembly 116 is positioned so that end 124 of electrode 120 is spaced from end 122 of electrode 118. Ends 122, 124 of electrodes 118, 120 each have a forging cap 126 affixed thereto.

One or more strain sensors 128 are affixed to arm 104—two in the example of FIG. 1. Electrodes 118, 120 are electrically coupled to a weld power supply 130 affixed to frame 102.

Movable electrode assembly 116 is mechanically coupled to servo-actuator 136. In an aspect, movable electrode assembly 116 is mechanically coupled to servo-actuator 136 by a gas spring 132. In an aspect, servo-actuator 136 has an actuator rod 134 and gas spring 132 is disposed between actuator rod 134 and movable electrode assembly 116 and mechanically coupled to each, such as to an end of actuator rod 134 and an end of movable electrode assembly 116. In an aspect, gas spring 132 is a nitrogen spring. A load cell 137 is disposed between movable electrode assembly 116 and gas spring 132. A controller 138 has inputs/outputs 140 coupled to UPJ forging gun 100 and is configured to control UPJ forging gun 100 as discussed in more detail below. An infrared temperature sensor 142 is situated to sense the temperature at forging caps 126.

UPJ forging gun 100 also includes a cooling system 144 that circulates cooling fluid, such as water, via cooling lines 146 to electrode assemblies 114, 116 to cool electrodes 118, 120 and forging caps 126. Illustratively, cooling system 144 includes a controllable proportioning valve 148 coupled to a source of cooling fluid (not shown) such as cooling water that is controlled by controller 138 in response to a temperature sensed by infrared temperature sensor 142 as discussed in more detail below.

In an aspect, UPJ forging gun 100 is configured to provide a tip force of 16,000 N (3,997 pounds) to forge magnesium protrusions having outer diameters in the range of 10 mm to 19 mm with zero gun deflection. That is, side plates 103, arm 104, electrode assemblies 114, 116 including their respective electrodes 118, 120 are sized so that they do not deflect under stress when UPJ forging gun 100 is used to forge the magnesium protrusions having outer diameters in the above discussed range. UPJ forging gun 100 is also configured to supply direct current of up to 14,000 amps for up to 30,000 msec.

Forging caps 126 are made of molybdenum, illustratively Class 14 molybdenum, or a copper-tungsten alloy (75% tungsten and 25% copper by mass), illustratively Class 11 copper-tungsten. Forging caps 126 are sized based on the size of the protrusions of the dissimilar parts that are forged. For example, a forging cap 126 having an outer diameter of 15 mm is used in forging a magnesium protrusion having a 7 mm outer diameter, a forging cap 126 having a 17 mm outer diameter is used in forging a magnesium protrusion having a 9 mm outer diameter and a forging cap 126 having a 19 mm outer diameter is used in forging a magnesium protrusion having an 11 mm outer diameter. It should be understood that UPJ forging gun 100 configured as described above is useable to forge magnesium protrusions having diameters in the range of 10 mm to 19 mm simply by changing the size of the forging cap 126 used, which in an aspect the size of the forging cap 126 is determined heuristically. It should also be understood that UPJ forging gun 100 configured as described above is useable to forge aluminum protrusions (when part 10 is an aluminum part) having diameters in the range of 10 mm to 19 mm by sizing the forging caps 126 appropriately, which in an aspect the size of the forging cap 126 is determined heuristically.

Figure 3:
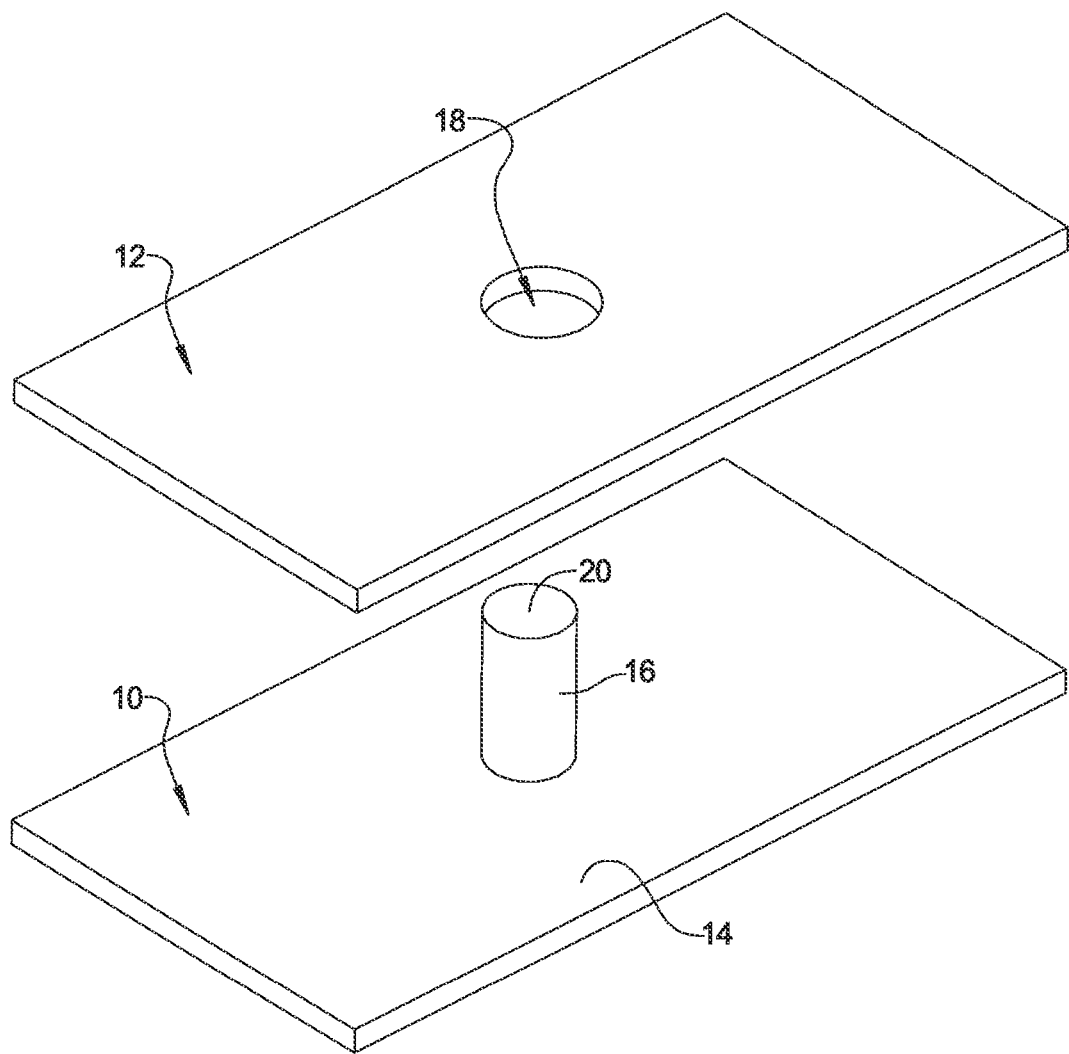
FIG. 3 is a perspective view showing in simplified form an example of two prior art parts joinable by upset protrusion joining.

Gas spring 132 helps ensure a constant force when servo-actuator is being controlled to force movable electrode assembly against protrusion 16 of part 10 (FIG. 3) and also allows for a quicker reaction time than with a servo-actuator without the gas spring. Servo-actuator 136 and gas spring 132 behave similar to an air/oil actuator system reducing spikes in a force curve as forging cap 126 attached to end 124 of electrode 120 contacts protrusion 16 and is forced against it. In an aspect, gas spring 132 is illustratively a KE 750-10-B nitrogen spring cylinder available from Tevema Amsterdam By, Dukdalfweg 35, 1041 BC Amsterdam, Postbus 409, 1005 AK Amsterdam, Netherlands.

Figure 2:
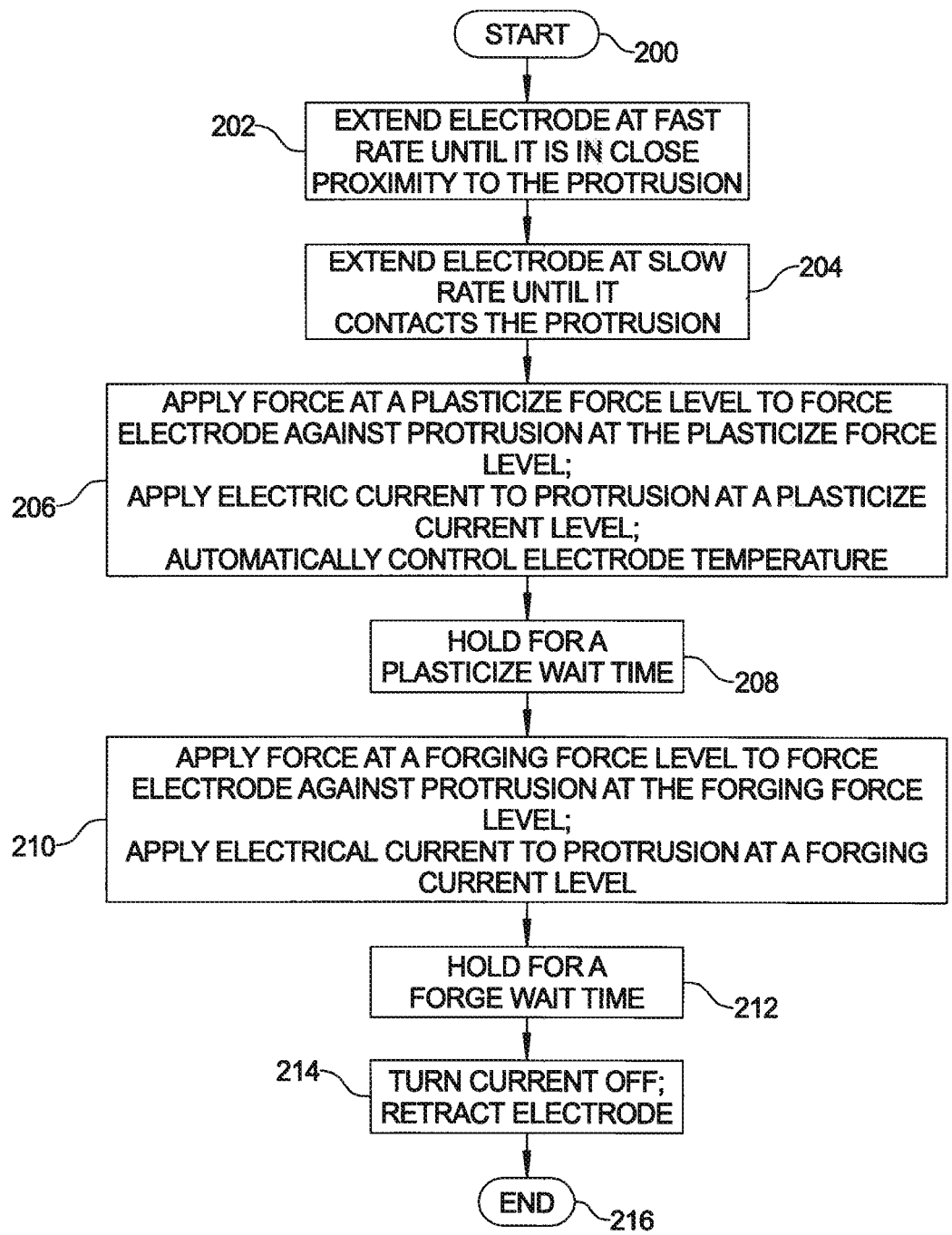
FIG. 2 is a flow chart of control logic of an example control routine for the control of the upset protrusion joining forging gun of FIG. 1 in accordance with an aspect of the present disclosure for joining two parts together by upset protrusion joining.

FIG. 2 is a flow chart of control logic for an example control routine for the control of UPJ forging gun 100 to join parts 10 and 12 (FIG. 3) together. Parts 10, 12 are situated with protrusion 16 of part 10 extending through opening 18 of part 12 and with forging cap 126 of electrode 118 in contact with base 14 underneath protrusion 16. In some cases, electrode 118 extends partially into protrusion 16. The control routine starts at 200. At 202, the control routine controls servo-actuator 136 to move electrode assembly 116 and thus electrode 120 toward a top 20 of protrusion 16 at a fast rate. When forging cap 126 of electrode 120 reaches close proximity to top 20 of protrusion 16, the control routine at 204 then controls servo-actuator 136 to move electrode assembly 116 toward top 20 of protrusion 16 at a slow rate until forging cap 126 of electrode 120 contacts top 20 of protrusion 16. The terms fast rate and slow rate are relative to each other and mean that the fast rate is a rate faster than the slow rate and in an example are determined heuristically such as to optimize cycle time. In an example the close proximity distance is also determined heuristically and in an example is 2 mm. In an example, the slow rate is ⅙ the fast rate. In an example, the slow rate is 20 mm per second and the fast rate is 120 mm per second.

The control routine then proceeds to 206 where it controls servo-actuator 136 to apply force at a plasticizer force level to force forging cap 126 of electrode 120 against top 20 of protrusion 16 at the plasticizer force level. Control routine also controls weld power supply 130 to supply electric current at a plasticizer current level that is applied to protrusion 16 via electrodes 118, 120. As used herein, plasticizer force level means force sufficient to prevent arcing but less than a force that causes cracking and plasticizer current level means a current level sufficient to cause protrusion 16 to reach a plastic state. The plasticizer force level and the plasticizer current level are dependent on the characteristics of parts 10, 12 being joined, such as the diameter of protrusion 16, whether the part 10 if it is magnesium is coated or not, the gage thickness of the 12, and the like. In an example, the plasticizer force level and plasticizer current level are determined heuristically and programmed into controller 138 but it should be understood that they can be determined in other manners, such as theoretically. The control routine also automatically controls the temperature of electrodes 118, 120 and thus the temperature of forging caps 126 by controlling proportioning valve 148 in response to the temperature of forging caps 126 sensed by infrared temperature sensor 142. It should be understood that the control routine automatically controls the temperature of electrodes 118, 120 for as long as current is being applied to them.

The control routine then proceeds to 208 where it holds for a plasticizer wait time. That is, the control routine maintains the plasticizer force level and the plasticizer current level for the plasticizer wait time. The plasticizer wait time is a time period at an end of which protrusion 116 has reached the plastic state. In an example, the plasticizer wait time is determined heuristically and programmed into controller 138, but it should be understood that the plasticizer wait time can be determined in other manners such as theoretically.

The control routine then proceeds to 210 where it controls servo-actuator 136 to apply force at a forging force level to force forging cap 126 of electrode 120 against top 20 of protrusion 16 at the forging force level. Control routine also controls weld power supply 130 to supply electric current at a forging current level that is applied to protrusion 16 via electrodes 118, 120. As used herein, forging force level means force sufficient to deform protrusion 16 to form a boss over a portion of part 12 surrounding opening 18 and tightly against this portion of part 12 and forging current level means a current level sufficient to cause protrusion 16 maintain its plastic state while it is being deformed. The forging force level and the forging current level are dependent on the characteristics of parts 10, 12 being joined, such as the diameter of protrusion 16, the size of a boss formed when protrusion 16 is deformed, whether the part 10 if it is a magnesium part is coated or not, the gage thickness of the part 12, and the like. In an example, the forging force level and forging current level are determined heuristically and programmed into controller 138 but it should be understood that they can be determined in other manners, such as theoretically.

The control routine then proceeds to 212 where it holds for a forging wait time. That is, the control routine maintains the forging force level and the forging current level for the forging wait time. The forging wait time is a time period at an end of which protrusion 16 has been deformed over part 12 to form a boss. In an example, the forging wait time is determined heuristically and programmed into controller 138, but it should be understood that the forging wait time can be determined in other manners such as theoretically.

The control routine then proceeds to 214 where it controls weld power supply 130 to turn the current to electrodes 118, 120 off and controls servo-actuator 136 to retract movable electrode assembly 116 thus retracting electrode 120 from protrusion 16. The control routine then ends at 216. Joined parts 10, 12 are then removable from UPJ forging gun 100 or UPJ forging gun 100 movable away from parts 10, 12, as applicable. In this regard, UPJ forging gun 100 is affixable to a robot arm (not shown) and moved to parts 10, 12 to weld them. Alternatively, UPJ forging gun 100 is part of a joining station (not shown) and parts 10, 12 then moved into the joining station.

Controller 138 in which the above described control routine is implemented is or includes any of a digital processor (DSP), microprocessor, microcontroller, or other programmable device which are programmed with software implementing the above described method. It should be understood that alternatively it is or includes other logic devices, such as a Field Programmable Gate Array (FPGA), a complex programmable logic device (CPLD), or application specific integrated circuit (ASIC). When it is stated that controller 138 or the control routine implemented in controller 138 performs a function or is configured to perform a function, it should be understood that controller 138 is configured to do so with appropriate logic (such as in software, logic devices, or a combination thereof).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An upset protrusion forging gun for joining two parts by deforming a protrusion extending from one of the parts through an opening of the other part to form a boss over a portion of the other part surrounding the opening, the upset protrusion gun comprising:
   a frame having an arm extending from an end of the frame that cooperates with the end of the frame to provide a C-shaped electrode holder assembly with opposed ends with one of the opposed ends at the end of the frame from which the arm projects;
   each of the opposed ends having an electrode assembly affixed thereto, at least one of the electrode assemblies being a movable electrode assembly that is movable with respect to the other electrode assembly;

each electrode assembly having an electrode projecting therefrom that projects toward the electrode that projects from the other electrode assembly;

each electrode having an inner end that faces the inner end of the other electrode;

the inner end of each electrode having a forging cap affixed thereto wherein the forging caps are molybdenum forging caps or tungsten-copper forging caps having 75% tungsten and 25% copper by mass;

a servo-actuator affixed to the frame and mechanically coupled to the movable electrode assembly;

a weld power supply affixed to the frame and electrically coupled to the electrodes;

a controller;

the controller configured to control the actuator to move the movable electrode assembly toward the protrusion of the part having the protrusion at a first rate until the inner end of the electrode of that electrode assembly is at a predetermined distance from the protrusion and then control the actuator to move the movable electrode assembly toward the protrusion at a slower rate until the forging cap on the inner end of the electrode of the movable electrode assembly contacts the protrusion;

when the electrode of the movable electrode assembly contacts the protrusion, the controller configured to control the actuator so that the electrode of the movable electrode assembly is urged against the protrusion at a plasticizer force level and to control the weld power supply to supply electric current at a plasticizer current level to the electrodes and maintain the plasticizer force level and plasticizer current level until the controller determines a plasticizer wait time has expired;

upon determining that the plasticizer wait time has expired, the controller configured to control the actuator so that the electrode of the movable electrode assembly is urged against the protrusion at a forging force level and control the weld power supply to supply electric current at a forging current level to the electrodes and maintain the forging force level and forging current level until the controller determines a forging wait time has expired; and upon determining that the forging wait time has expired, the controller configured to control the weld power supply to turn current off and to control the actuator to retract the movable electrode assembly.

2. The upset protrusion forging gun of claim 1 wherein the actuator is mechanically coupled to the movable electrode assembly via a gas spring.

3. The upset protrusion forging gun of claim 2 wherein the gas spring is a nitrogen spring.

4. The upset protrusion forging gun of claim 1 further including a cooling system that circulates cooling fluid to the electrode assemblies and an infrared temperature sensor disposed to sense a temperature of at least the forging cap on the inner end of the electrode of the movable electrode assembly, the controller configured to control the flow of cooling fluid to the electrode assemblies in response to the temperature sensed by the infrared temperature sensor when current is being supplied to the electrodes to control the temperature of at least the forging cap on the inner end of the electrode of the movable electrode assembly.

5. The upset protrusion forging gun of claim 1 wherein the upset protrusion forging gun is configured to apply a force against the protrusion by the electrode of the movable electrode assembly of up to 16,000 Newtons and the weld power supply configured to supply direct current of up to 14,000 amps for up to 30,000 msec.

6. The upset protrusion joining gun of claim 5 wherein the forging caps have diameters in a range from 15 to 19 mm.

7. The upset protrusion joining gun of claim 1 wherein one of the parts is a magnesium part having the protrusion and the other part is an aluminum part.

8. The upset protrusion joining gun of claim 1 wherein one of the parts is a magnesium part having the protrusion and the other part is a steel part.

9. The upset protrusion joining gun of claim 1 wherein one of the parts is an aluminum part having the protrusion and the other part is a steel part.

* * * * *